United States Patent
Armiroli et al.

(10) Patent No.: US 7,391,180 B2
(45) Date of Patent: Jun. 24, 2008

(54) PULSE WIDTH MODULATION CONTROL CIRCUIT FOR A MULTIMODE ELECTRICAL MACHINE, AND A MULTIMODE ELECTRICAL MACHINE EQUIPPED WITH SUCH A CONTROL CIRCUIT

(75) Inventors: Paul Armiroli, Marolles en Brie (FR); Cédric Plasse, Garches (FR)

(73) Assignee: Valeo Equipements Electrique Moteur, Creteil (FR)

( * ) Notice: Subject to any disclaimer, the term of this patent is extended or adjusted under 35 U.S.C. 154(b) by 0 days.

(21) Appl. No.: 10/559,015

(22) PCT Filed: Jun. 1, 2004

(86) PCT No.: PCT/FR2004/001352
§ 371 (c)(1),
(2), (4) Date: Feb. 12, 2007

(87) PCT Pub. No.: WO2005/109624
PCT Pub. Date: Nov. 17, 2005

(65) Prior Publication Data
US 2007/0200531 A1 Aug. 30, 2007

(30) Foreign Application Priority Data
May 30, 2003 (FR) .................................. 03 06554

(51) Int. Cl.
*H02P 27/04* (2006.01)

(52) U.S. Cl. ..................... 318/801; 318/701; 318/700; 180/65.1; 180/65.2

(58) Field of Classification Search ................ 318/138, 318/139, 254, 439, 700, 701, 800, 803, 812, 318/813, 801; 180/65.1, 65.2; 701/22
See application file for complete search history.

(56) References Cited

U.S. PATENT DOCUMENTS

| 6,366,048 | B2 * | 4/2002 | Greif .......................... 318/701 |
| 6,902,018 | B2 * | 6/2005 | Hisada et al. .............. 180/65.1 |
| 7,100,721 | B2 * | 9/2006 | Atarashi et al. ............ 180/65.2 |
| 7,228,209 | B2 * | 6/2007 | Izawa et al. ................... 701/22 |
| 2002/0007975 | A1 | 1/2002 | Naito et al. |
| 2002/0043953 | A1 * | 4/2002 | Masaki et al. ............... 318/700 |
| 2003/0034187 | A1 * | 2/2003 | Hisada et al. .............. 180/65.1 |
| 2003/0034755 | A1 | 2/2003 | Krefta et al. |

FOREIGN PATENT DOCUMENTS

| EP | 0-660-501 | 6/1995 |
| EP | 0-901-930 | 3/1999 |
| EP | 1-219-493 | 7/2002 |
| FR | 2-745-445 | 8/1997 |
| FR | 2-802-363 | 6/2001 |

OTHER PUBLICATIONS

International Search Report, Application PCT/FR2004/001352, dated Nov. 23, 2004 (7 pages).

\* cited by examiner

*Primary Examiner*—Paul Ip
(74) *Attorney, Agent, or Firm*—Osha Liang LLP

(57) ABSTRACT

A pulse width modulation (PWM) control circuit for a multimode electrical machine and a multimode electrical machine equipped with such a control circuit, including a configuration circuit that detects the operation mode of the electrical machine and produces a pulse width modulation to control a reversible current inverter circuit such that the electrical machine operates optimally in torque in engine modes and in current generator modes. The invention applies to vehicle alternators and starters.

30 Claims, 4 Drawing Sheets

PULSE WIDTH MODULATION CONTROL CIRCUIT FOR A MULTIMODE ELECTRICAL MACHINE, AND A MULTIMODE ELECTRICAL MACHINE EQUIPPED WITH SUCH A CONTROL CIRCUIT

FIELD OF THE INVENTION

The present invention relates to Pulse Width Modulation (PWM) for a multimode rotating electrical machine, such as, for example, an alternator starter and a multimode electrical machine equipped with such a control circuit.

PRIOR ART

A need is apparent in the prior art that the same multimode electrical machine may operate successively as a starter for a thermal engine, as an engine, or even as a direct current generator to recharge the power supply battery for the on-board power supply network, directly as an alternator in the prior art, or even indirectly by cooperating in an operation mode of the power train allowing recovery of braking energy. However, the electromechanical design of the electrical machine promotes an operation in alternator mode or rather an operation in optimized engine mode in regulated torque. It results that the overall efficiency and performance of an electrical machine that was designed to operate as a current generator and that works in engine mode will always be inferior to the overall efficiency of an electrical machine designed to operate in engine mode, and vice versa.

The use of an alternator as a starter as well with the help of a converter circuit that is capable of producing a full wave at the stator windings of the electrical machine only during a starting sequence has already been proposed in the prior art, particularly in application FR-A-2.745.445. But such a control circuit cannot deliver enough current when one wishes to work at reduced rotation speed, for example, when the electrical machine must work as an assistance engine for the power train.

The present invention provides a solution to the problem of the design of a single machine allowing operation as a starter for a thermal engine, as an electrical drive motor connected to the rest of the power train and drive wheels of a vehicle, in an assistance or increase mode ("boost") for torque or engine power, or even as an electrical generator, operating in alternator or mechanical braking energy recovery.

Particularly, in the automotive industry, the direct current voltage of the on-board power supply network may differ according to the models. Supplies in 6 volts, 12 volts, 24 volts and even 48 volts are known. The electromechanical design of an electrical machine adapted to operate over any on-board power supply network requires compromises that modify its performance.

The present invention provides a solution to the problem of adapting an electrical machine that may operate as an engine or a generator over a continuous supply system with various standards.

OBJECT OF THE INVENTION

To remedy these disadvantages of the prior art, the present invention proposes a pulse width modulation PWM control circuit for a polyphase electrical machine designed to be mounted on the power train of a vehicle, a circuit of the type comprising:

- a chopper bridge connected between two continuous line terminals wherein each terminal controlled is designed to be connected to at least one phase of the stator of the electrical machine;
- a plurality of sensors designed to measure the current and/or voltage in each phase of said electrical machine;
- circuitry for producing instantaneous information on the position and speed of rotation of the rotor of the electrical machine;
- a pilot circuit for branches of the bridge according to the electrical measurements in the phases and/or the position and speed of the rotor.

The control circuit of the invention also comprises a circuit generator for configuration signals of the pilot circuit of the branches of the bridge according to the desired mode of operation of the electrical machine taken from among the operation modes such as starter, electrical drive motor, electrical assistance motor for the internal combustion engine, alternator or recovery of braking energy alternator.

The present invention also relates to a novel electrical machine for a vehicle, that may operate as a starter, electrical drive motor, electrical assistance motor for the internal combustion engine, alternator or braking energy recovery alternator and adapted to operate with a control circuit according to the invention. The invention is characterized in that the electrical machine comprises a wound stator wherein the number of coils is calculated on the basis of the lowest magnetization energy with a number of coils at the lowest stator and in that for operation modes demanding higher magnetization energy, current control of the stator is applied using the control circuit.

DESCRIPTION OF THE DRAWINGS

Other advantages and characteristics of the present invention will be better understood with the help of the description and attached drawings in which.

DESCRIPTION OF PREFERENTIAL EMBODIMENTS OF THE INVENTION

Figure 1:
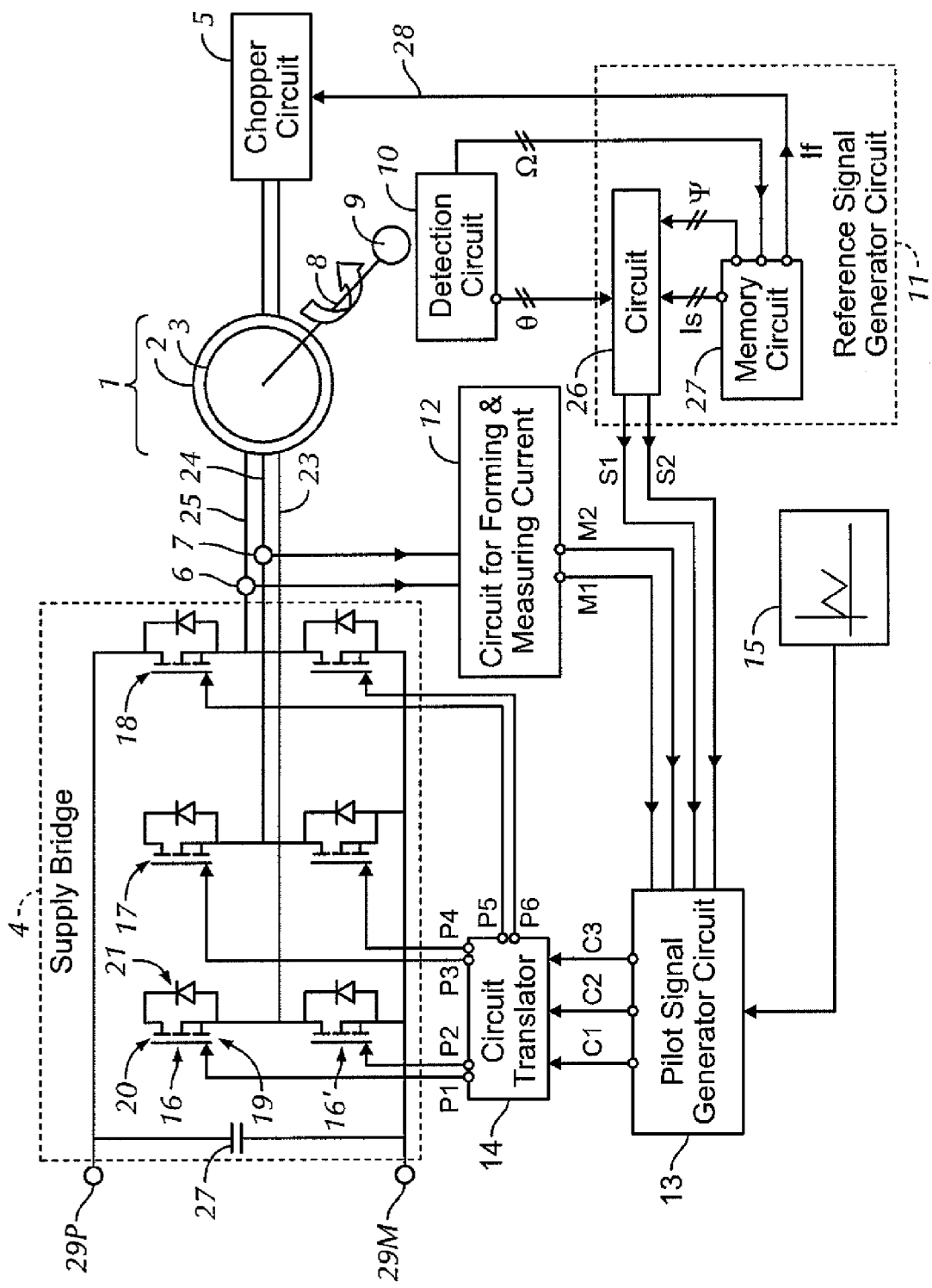
FIG. 1 is a block diagram representing an embodiment of the circuit of the invention.

FIG. 1 represents a block diagram of a particular embodiment of the circuit of the invention. The electrical machine 1 essentially comprises a stator 2 equipped with a plurality of windings of conductive wires, or phases, according to the geometries of the dispositions of electrical coils that allow the design as known to a person skilled in the art of a rotating electrical machine equipped with a rotor 3 rotating inside the stator.

In an example of an embodiment of FIG. 1, the stator 2 is equipped with three windings, not represented, that may be mounted with a common point (in a star) or that are connected successively to each other (in a triangle), or even by coils connected in a triangle star. Each supply point of a winding of the stator 2 is connected to the controlled terminal of a branch 16, 17 or 18 of a bridge 4. The bridge 4 is an essential element of the alternating current converter necessary to power the electrical machine in engine mode, or to convert the current produced by the machine when the machine operates as a generator (alternator) in direct current due to the fact of its connection to the on-board power supply network connected to the battery of the vehicle by the positive 29B and negative 29N terminals.

A branch of the bridge 4, as the branch 16, is constructed by installing two semiconductor interrupters 16 and 16' in series, wherein the control terminals used to establish conduction are connected to the control outputs P1 and P2 of a pilot circuit 14. Conventionally, a semiconductor interrupter as the interrupter 16 is comprised of a MOS type transistor 20 wherein the conducting path between the drain and source electrodes presents an intrinsic antiparallel diode 21. The control electrode of the semiconductor interrupter is comprised of the gauze electrode of the transistor 20. According to the voltages applied to this gauze electrode, the interrupter 16 is in a conducting state or in a state of high impedance in which no current may cross the direct path of the drain to the source. However, because of the highly inductive character of the windings of the stator 2, rapidly variable voltages appear between the various continuous polarities for powering the bridge 4 and the controlled terminal of each branch of the bridge 4. One of the functions of the pilot circuit 14 and of each intrinsic diode as the diode 21 is to reduce the flooding effect of the commutating voltages. The measurements implemented in the pilot circuit 14 are not described further and are within reach of a person skilled in the art.

Furthermore, the rotor 3 of the electrical machine 1 is coupled by an electrical means to an active electronic circuit 5 that allows the direct current voltage of the on-board power supply network to be cut in such a way as to provide variable electrical voltages in a controlled manner in such a way as to produce an operation in engine or in generator mode for the electrical machine 1. Such a clipping logic is principally constructed around a semiconductor interrupter (not represented), wherein the control electrode for establishing conduction is alternatively applied to an activation potential or to a resting potential in such a way as to produce a frequency wave and a given amplitude. In an embodiment, circuit 5 is combined with the power stage of the line driver of the winding of the rotor 3. The regulator circuit of this power stage may be integrated in the circuit 5.

A spindle 8 is mounted on the rotor 3 in such a way as to transmit the mechanical movement of the rotor to a coupling device (not represented) comprising a gear assembly and/or a band pulley device that are coupled as is known to a person skilled in the art to the rest of the drive train of the vehicle, particularly to the crankshaft of the thermal engine, especially when the electrical machine 1 operates as a starter or as an alternator.

The spindle 8 is coupled to a rotation sensor 9 that produces a representative signal of the instantaneous rotation of rotation of the rotor 8, a signal that is processed by a circuit 10 for detecting rotation. The rotation detection circuit 10 produces a first Theta signal representative of the instantaneous angle of rotation of the rotor with relation to a reference position. The rotation detection circuit 10 produces a second Omega signal representative of the angular speed of rotation of the rotor.

The two signals produced by the rotation detection circuit 10 are transmitted to inputs of a circuit 11 that produces, first, a switching control signal by a line 28 bound for the chopper circuit 5 and secondly, a plurality of reference signals bound for the supply bridge 4 of the stator 2 of the electrical machine 1.

On each of the three supply lines of the three phases 23, 24, and 25 of the stator 2 of the electrical machine 1 are disposed current sensors, as sensors 6 and 7, wherein the signals are transmitted to a circuit 12 for forming and measuring the current in the stator phases. The circuit 12 for forming and measuring current in the stator phases produces at least two stator current measuring signals M1 and M2 that are transmitted to appropriate inputs of the pilot signal generator circuit 13. According to an embodiment, the sum of stator current is null because the stator is electrically balanced. In the case of a machine with N stator phases, the control circuit of the invention comprises N−1 current sensors and produces N−1 reference signals. In other embodiments, the electrical machine is not balanced and a current sensor is provided for each winding of the stator.

A generator circuit 15 of a base wave is provided wherein an output is connected to an input terminal of the pilot signal generator circuit 13. In a particular embodiment, the base wave is comprised of a wave in a triangular form, that presents a first front increasing at a first speed and a second front decreasing at a second speed. In a preferred manner, the first speed is slower than the second speed. Other forms of base waves are provided in the present invention.

The pilot signal generator circuit 13 produces three pilot signals C1, C2 and C3 that are connected to the inputs of a circuit translator 14 essentially comprised of amplifiers that allow the pilot signals to control the grids of different semiconductor interrupters of the bridge 4 by the signals for establishing conduction P1 to P6, and that are produced by:

- an output terminal of a control signal P1 for establishing conduction of the semiconductor interrupter 16 as regards the elevated voltage of the first branch of the bridge 4 associated with the first winding 23 of the stator 2 of the electrical machine 1;
- an output terminal of a control signal P3 for establishing conduction of the semiconductor interrupter 17 as regards the elevated voltage of the second branch of the bridge 4 associated with the second winding 24 of the stator 2 of the electrical machine 1;
- an output terminal of a control signal P5 for establishing conduction of the semiconductor interrupter 18 as regards the elevated voltage of the second branch of the bridge 4 associated with the second winding 25 of the stator 2 of the electrical machine 1 and
- the three output terminals P2, P4 and P6 for conduction control of controlled interrupters as interrupter 16' of each of the three branches of the bridge that allow the connection of a winding to the ground line by the terminal 29N that works each according to the control law applied to the terminal P1 or P3 or P5 as it is known.

It must be understood that, for the three interrupters disposed at the points of minimum voltage of each branch of the bridge 4, the circuit 14 generates corresponding signals on the same principle. Particularly, these signals are directly obtained over a complementary output terminal of each comparator 33, 36 or 38. This disposition also allows circuits adding delays in the switchings according to the additional control loops, not shown here, to be added according to the corrections that are necessary in the circuit diagrams of bridge 4 and to provide control at a level that is sufficient to change the state of conduction of each controlled interrupter at the grid electrode to which the output terminal of the circuit 14 is connected.

Figure 2:
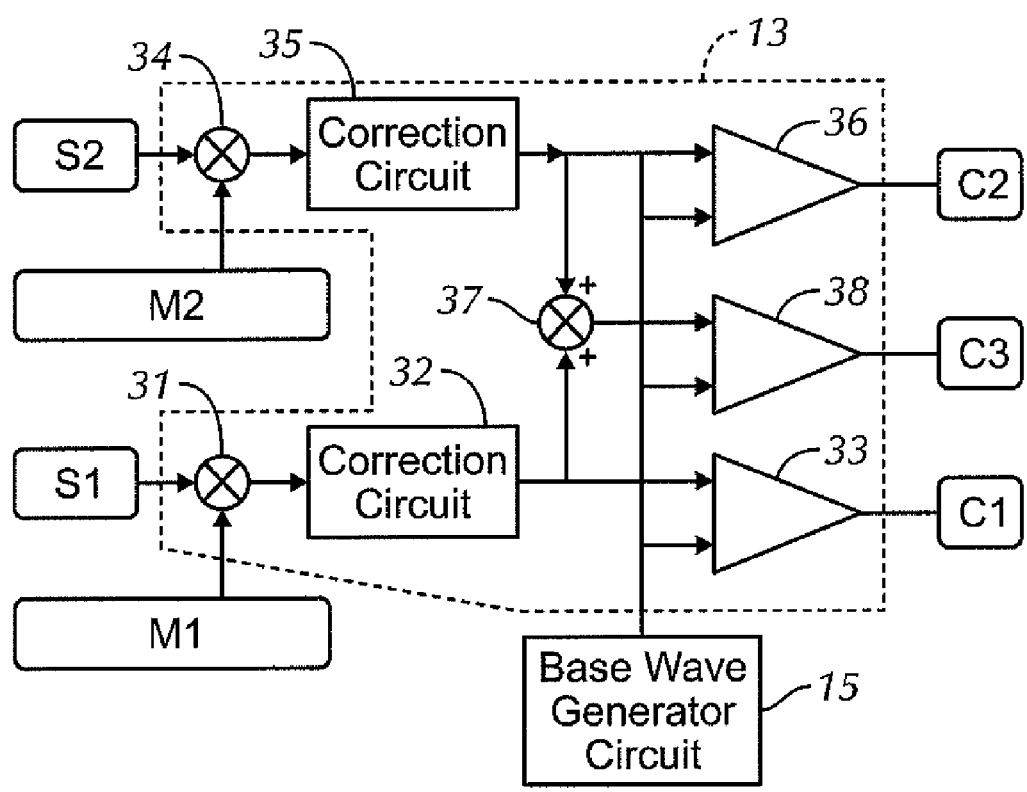
FIG. 2 is a block diagram representing a part of the circuit of FIG. 1.

FIG. 2 represents a particular embodiment of a pilot signal generator circuit 13 according to the invention. In FIG. 2, the elements analogous to those of FIG. 1 apply the same reference numbers and are not described further. The circuit 13 presents five input terminals that are respectively:

- an input terminal of a reference signal S1 issued from circuit 11;

an input terminal of a measuring signal M1 issued from the current measuring circuit;

an input terminal of a reference signal S2 issued from the circuit 11;

an input signal of a measuring signal M2 issued from the current measuring circuit;

an input signal of the pilot signal issued from the pilot signal generator circuit 13.

The circuit 13 presents three output terminals that are respectively:

an output terminal of a control signal C1 designed to control the switching of the first branch of bridge 4 associated with the first stator winding 23;

an output terminal of a control signal C2 designed to control the switching of the second branch of bridge 4 associated with the third stator winding 25.

The circuit 13 comprises a first subtractor 31 wherein a first positive input terminal is connected to the input terminal of the first reference signal S1 and wherein a second negative input terminal is connected to the input terminal of the first measuring signal. The output terminal of the first subtractor 31 is connected to an input terminal of a correction circuit 32 that applies a correction function F1( ) that is presented at the output of the correction circuit 32 in the form:

$$A1=F1(S1-M1).$$

In a particular embodiment, the correction function F1( ) applies a multiplicative type factor F1, predetermined and recorded in the correction circuit according to the electrodynamic characteristics of the electrical machine 1, according to the relationship:

$$A1=F1\times(S1-M1).$$

The output signal A1 (not represented) issued from the correction circuit 32 is applied to a first input terminal of a comparator 33 wherein a second input terminal for comparison is connected to the output of the pilot signal generator circuit 13, preferentially in triangular form. The output terminal of the comparator 33 delivers a signal that switches from an inactive state for example 0 V, to an active signal for example corresponding to the supply voltage of the comparator to cause the state of conduction of the controlled interrupter 16 to change at the grid electrode to which the output terminal of the comparator 33 is connected.

The circuit 13 comprises a second subtractor 34 wherein a first positive input terminal is connected to the input terminal of the second reference signal S2 and wherein a second negative input terminal is connected to the input terminal of the second measuring signal M2. The output terminal of the second subtractor 34 is connected to an input terminal of a correction circuit 35 that applies a correction function F2( ) that is presented at the output of the correction circuit 35 in the form:

$$A2=F2(S2-M2).$$

In a particular embodiment, the correction function F2( ) applies a multiplicative type factor F2, predetermined and recorded in the correction circuit according to the electrodynamic characteristics of the electrical machine 1, according to the relationship:

$$A2=F2\times(S2-M2).$$

The output signal A2 (not represented) issued from the correction circuit 35 is applied to a first input terminal of a comparator 36 wherein a second input terminal for comparison is connected to the output of the pilot signal generator circuit 13, preferentially in triangular form. The output terminal of the comparator 36 delivers a signal that switches from an inactive state for example from 0 V, to an active signal for example corresponding to the supply voltage of the comparator and at a level that is sufficient to cause the state of conduction of the controlled interrupter 18 to change at the grid electrode to which the output terminal of the comparator 36 is connected.

The output terminals of the two correction circuits 32 and 35 are also connected to the respective input terminals of an adder 37 wherein the output terminal is applied to a first input terminal of a comparator 38 wherein a second input terminal for comparison is connected to the output of the pilot signal generator circuit 15, preferentially in triangular form. The output terminal of the comparator 38 delivers a signal that switches from an inactive state for example from 0 V, to an active signal for example corresponding to the supply voltage of the comparator.

Figure 3:
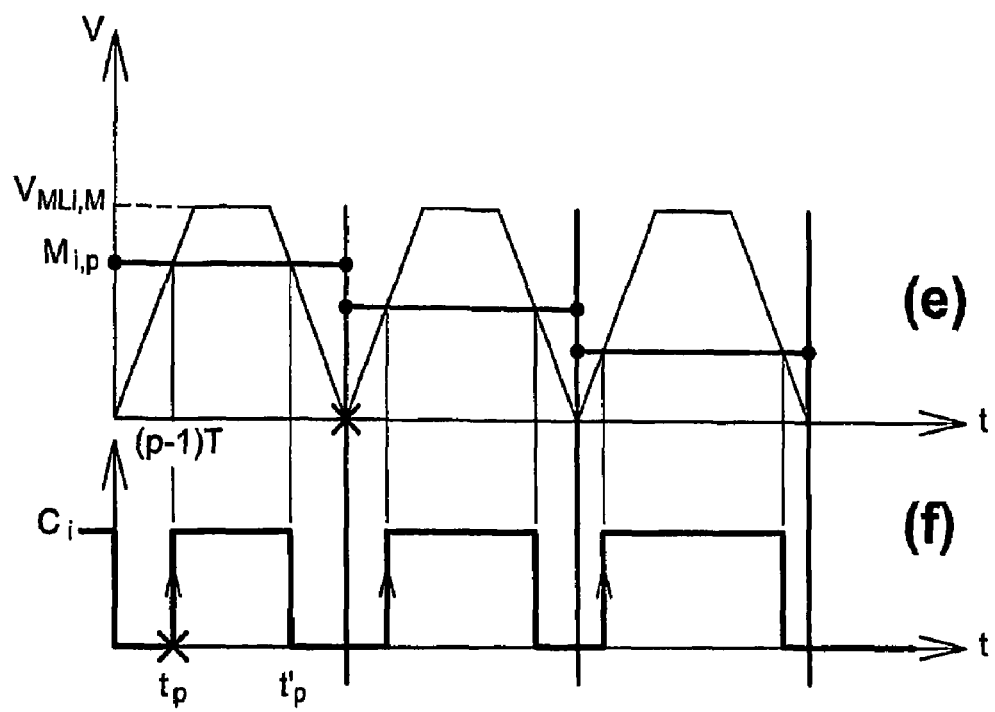
FIGS. 3 to 6 represent diagrams defining different command modes of the circuit of the invention.

FIG. 3 represents six timing diagrams (a) to (f) explaining the operation of control signal generator circuit 13 applied to the control electrodes of the bridge 4 across the amplifier circuit 14. For any one of the phases I of the stator windings, the sawtooth wave represented in FIG. 3(a) passes slowly from a null value to a VMLI value, M maximum, then falls again with a speed that is as rapid as possible to the null value during a period T. This wave is connected through the generator 15 to the second input terminal of the comparators of the generator 15 to the second input terminal of the comparators of the circuit 13. The sawtooth wave is generated identically to itself in a frequency F=1/T determined according to the electrodynamic characteristics of the electrical machine.

Periodically, at each period T, or successively at times pT, (p+1)T, (p+2)T represented on the x-axis, the difference signal, affected if necessary by its correction, or:

$$Ai=Fi(Mi-Si)$$

is compared during the duration of the corresponding period to the triangular wave in the course of increasing. When the two values, or the value V corresponding to the instantaneous value of the voltage of a triangular wave and the value Ai·p of the difference signal corrected during the pth period, are detected to be equal by the comparator at the input terminals to which six values are applied, the comparator places its output in the active state, which is represented at different times tp, tp+1 and tp+2. Then, the comparator almost instantaneously passes again to the inactive state for the new period, as is represented in FIG. 3b.

Diagrams (c) and (d) represent a second embodiment of a control signal by using a reference wave in the form of a triangular wave in which, according to the ascending and descending slopes and at the maximum reference level VMLI, M it is possible to vary a conduction start time tp and a conduction end time t'p at each period p of the reference wave. When the measuring signal Mi,P becomes greater than the reference signal, the circuit 13 switches an output Ci to an active value at the time tp and when the reference signal Mip again becomes less than the reference signal Si, the circuit 13 again places its output Ci at the inactive state at the time t'p.

Such a wave form reduces the harmonic components since switchings between phases are no longer simultaneous.

Diagrams (e) and (f) represent a third embodiment of a control signal by using a reference wave in the form of a trapezoidal wave in which, according to the ascending and descending slopes and at the maximum reference level VMLI, M it is possible to vary a conduction start time tp and a conduction end time t'p at each period p of the reference wave according to the same mechanism as in the aforesaid diagrams. However, the constant voltage VML1.i part of each reference signal Si assures that a certain duration of no change in the state of bridge 4 will be assured which avoids certain anarchic switchings.

Therefore one achieves a pulse width modulation of a given frequency that may be parametered during use and with variable cyclic ratio according to the current measured in the phase as well as a reference signal that corresponds to the operation mode of the electrical machine at the time of the comparison performed in circuit 13.

For this purpose, the reference signal generator circuit 11 applied to the generator circuit 13 as well as the control signal 28 applied to the winding supply chopper circuit 5 of the rotor 3 comprises circuitry, not represented, for detecting the operation mode of the electrical machine 1. Preferentially, the operation mode detection circuitry comprises further circuitry for decoding a control applied to the electronic machine to an on-board computer deciding the operation from among the following modes:

- an operation mode as the starter of the thermal engine;
- an operation mode as the alternator for recharging the electrical battery connected to the on-board direct current power supply network;
- an operation mode as a drive motor working directly on the vehicle wheels or indirectly by adding its mechanical power to the mechanical power provided by the rest of the drive train;
- an operation mode as a generator working in recovery of the braking energy required by the drive train.

In practice, positive or negative torque control indicates an alternator or engine mode and the value sets the level of required power. In a particular embodiment, information integrating a datum such as the speed of the vehicle is detected on the data network circulating in the vehicle as a ADC network and is detected by an appropriate module connected to the ADC bus to decode said information authorizing or not authorizing passage into starter mode of the control circuit.

Each operation mode of the electrical machine corresponding in particular to a different program for generating reference signals S1, S2 and control signal If of the chopper 5 allows, according to the electrical construction parameters of the electrical machine, an optimal operation of the electrical machine 1 to be assured in terms of the torque applied on the spindle and/or the rotation speed.

Now the principles of constructing an electrical machine adapted to the control circuit of the invention will be described.

The electrical machine must work and be optimized for the four modes defined above in such a way that one may increase the efficiency and the dynamic performances of the machine.

The control circuit of the machine that was described above allows a complete internal control of the electrical operation parameters of the machine to be performed. The power delivered by the machine is only limited by the electrical energy available on the on-board network (battery), the energetic state of the thermal engine and the environment of the vehicle (resisting torques on the vehicle wheels in particular).

In the engine operation modes, and among the latter in the torque assistance functions, the electrical machine must maintain a level of maximum mechanical power over a large range of rotation speeds for the electrical machine. Therefore, mechanical torque in engine mode is necessary to assist the thermal engine, but is also necessary at a higher speed in thermal engine assistance mode and in the zone where maximum torque is necessary. Particularly, the construction parameters of the electrical machine are going to depend on the reducing ratio applied by the coupling device of the electrical machine to the rest of our engine.

The torque applied directly depends on the current that crosses the rotor If and the current that crosses the stator Ir. According to the invention, the equations that allow the number ns of coil turns to the stator are determined by:

$$C = k \times If \times Is$$

$$K = k' \times ns$$

Therefore, to increase the torque available on the rotor, the current in the stator must be increased for a number ns of coil turns to the given stator. But, for a given dissipated power, the increase in the stator current requires a reduction of the coil resistance by reducing the number of turns and by increasing the conductive section of the wire windings of the stator.

In the same time, the reduction in the number of turns ns of windings to the stator leads to a reduction in the value of the electromotor force that allows a higher current to be accepted in the stator coils because of the relationship:

$$E = k1 \times If \times \text{Omega}$$

In which k1 depends on the number ns of turns to the stator. The expression of the torque C available to the rotor is then determined by the relationship:

$$C = k \times If \times (Ub - e)/r$$

Where Ub represents the voltage between the terminals 29P and 29N connected to the onboard network, e is the electromotor force and r is the resistance to the stator. The reduction in the number of stator turns ns leads to a modification of the magnetic circuit.

In engine mode, the reduction in the number of stator turns ns increases the power at elevated rotation speeds going from 3000 to 7000 revolutions per minute for conventionally used electrical machines for a vehicle, but this reduction in the number of coils diminishes the mechanical power and therefore the low speed torque under 1800 revolutions per minute or the starting torque is determined by the relationship:

$$C = k \times ns \times If \times Is.$$

In this case also, it is possible to remedy such a disadvantage of the structure of the electrical machine by reinforcing the current in the stator by using the control circuit of the invention as was described by using the previous figures.

In a starter operation mode, the current in the stator is determined by the relationship:

$$Ls = (Ub - e)/r$$

This current is important and required by the very low resistance of the stator windings. Because of this, supply control of the stator in full wave would impose a too high5 heating. According to the invention, the circuit 11 then proposes a program allowing to work in pulse width modulated wave MLI limiting the current to acceptable values.

In the alternator operation mode, beyond a determined rotation speed, the existence of a low number of turns ns to the stator will increase the power available to the stator, but will reduce the electromotor force at low speeds according to the relationship:

$$E = k \times If \times ns \times \text{Omega}.$$

a) This electromotor force is no longer sufficient at low speeds and remains lower than the voltage delivered by the battery and therefore does not allow current in alternator mode to be created.

b) At higher rotation speeds, the low electromotor force e reduces the armature reaction, which increases power and efficiency.

According to the invention, once the electrical machine is determined by these principal parameters, the control circuit of the invention allows three parameters to be managed to control the operation and the mode of operation of the electrical machine, these parameters are:

The excitation current to the rotor lf;
The current to the stator is; and
The electrical phase to the stator $\Psi$ that is the angle between the current in the stator phase and the voltage and the voltage in the same phase to the stator.

The control of these three parameters permits the desired precise values of torque and mechanical power to be obtained. The control circuit of the invention will limit the current required at the battery particularly in the starter mode and will maintain the voltage of the battery beyond the moiety of its nominal value. In this case, the battery delivers its maximum power.

The maximum positive torque is obtained when the electromotor force is in phase with the current imposed at the stator knowing that on the totality of the operation range of the electrical machine in engine mode, the stator electrical phase $\Psi$ may vary from 0 to 90 angle degrees. According to the notations used here, a positive torque value means that the machine transforms from electrical power to mechanical power.

Figure 4:
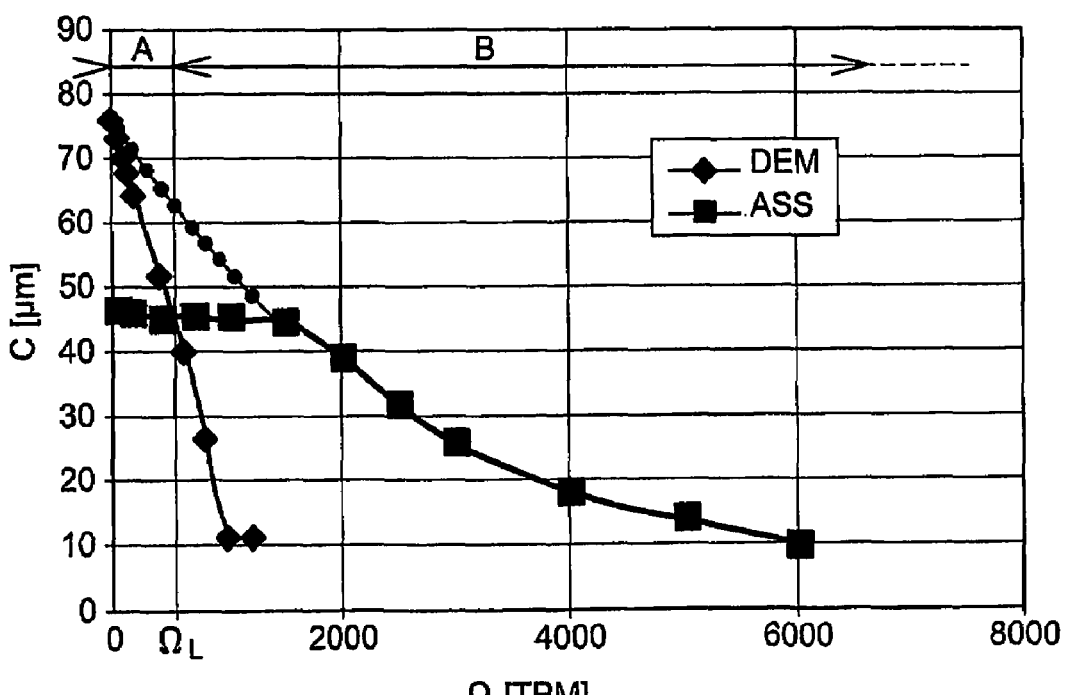

FIG. 4 represents an operation diagram of an electrical machine connected to a control circuit of the invention, wherein the reference signal generator circuit 11 comprises a program for its operation in engine mode according to two zones named zone A and zone B. In engine operation mode, the separation between the two zones is determined by a speed limit $\Omega L$, for example 1,500 revolutions per minute.

The circuitry for generating reference signals for the control of the pulse width modulation is therefore programmed according to at least two engine modes:

A starter mode typically represented by a DEM type curve;
A drive train help mode typically represented by an ASS type curve.

In DEM starter mode, the control circuit of the invention determines a pulse width modulation that presents a constant output torque for a rotation speed W varying from the null speed to a speed limit, then that presents a constant decrease in speed up to a maximum speed.

In ASS help mode, the control circuit of the invention determines a pulse width modulation that presents an output torque decreasing linearly from a determined speed, said separation speed $\Omega L$ between two zones A and B on the graphic of FIG. 4, the speed corresponding advantageously to the idling speed of the thermal engine, up to approximately 7,000 revolutions per minute.

Figure 5:
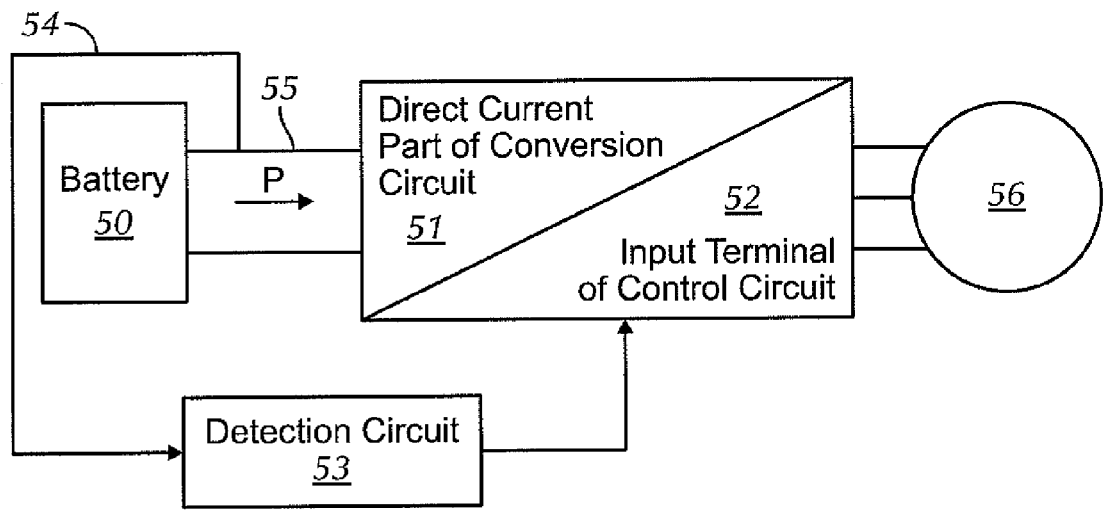

FIG. 5 represents a configuration of the control circuit of the invention in start-up mode when the machine starts to operate in engine mode that furthermore comprises a circuit 53 for detecting when the voltage generated by the battery 50 is greater than the moiety of a nominal value U0 of operation of the battery 50 with a predetermined ground voltage $\Delta U$.

The detection circuit 53 is connected by an input terminal 54 to the positive supply line 55 between the battery 50 and the direct current part of the conversion circuit 51 used in the control circuit of the invention and by an output terminal to an input terminal of configuration of the control circuit 52.

In alternator mode, when the electromotor force does not allow the voltage over the on-board network to be exceeded, due to the relative low number of stator coils and the low speed, the control circuit is programmed to generate an overvoltage compensation in the windings to exceed the battery voltage and therefore allow the alternator to draw a current. The circuitry for controlling the pulse width modulation comprises further circuitry for producing reference signals for the control of the stator that uses as features the input of the current in each stator phase, the excitation current in the rotor and the electrical angle in each stator phase.

In a particular embodiment, the circuitry for producing reference signals for the control of the stator also comprises circuitry for receiving a configuration load command, that may be provided by a control computer from the drive train and/or from the entire vehicle to determine if the alternator must work at full load or at reduced load.

In a particular embodiment, the circuitry for producing reference signals for the control of the stator also comprises circuitry to place the control circuit 13 in a state such that the bridge 4 produces a sinusoidal wave presenting a phase advance psi $\Psi$ between 90 and 180 degrees of angle.

Figure 6:
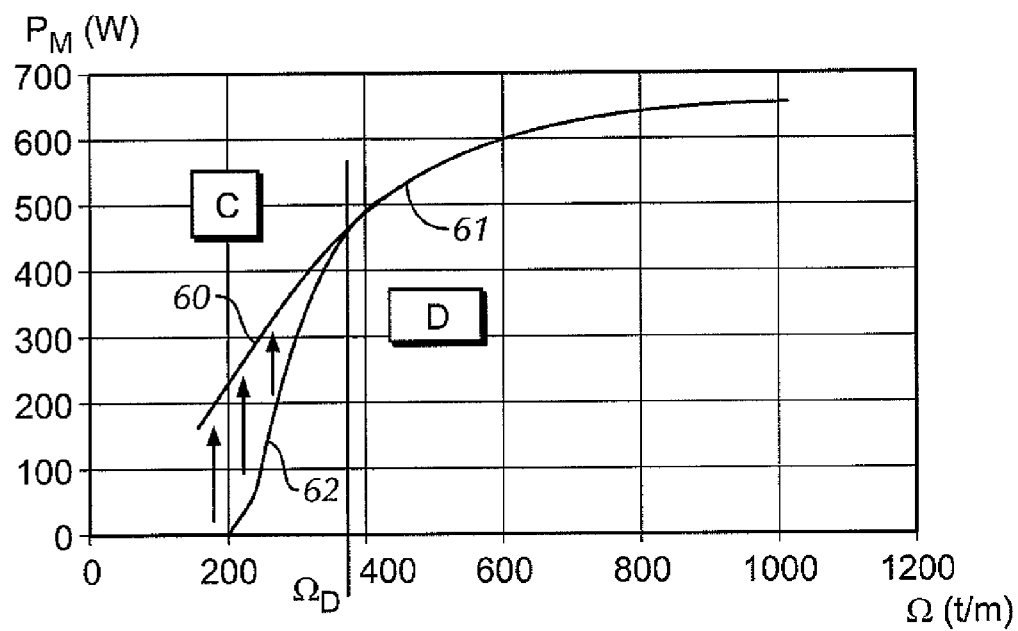
Figure 1:
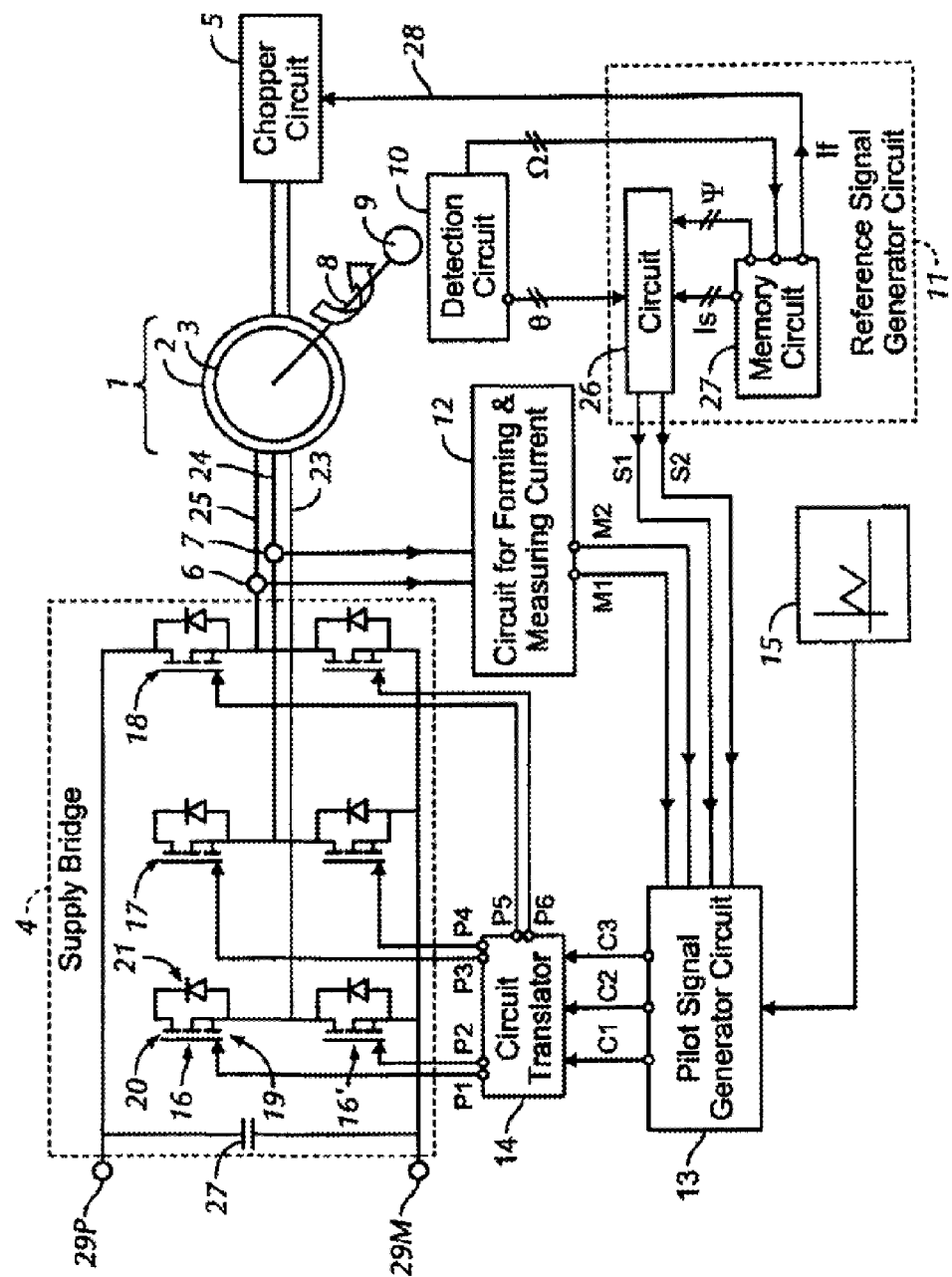
Figure 2:
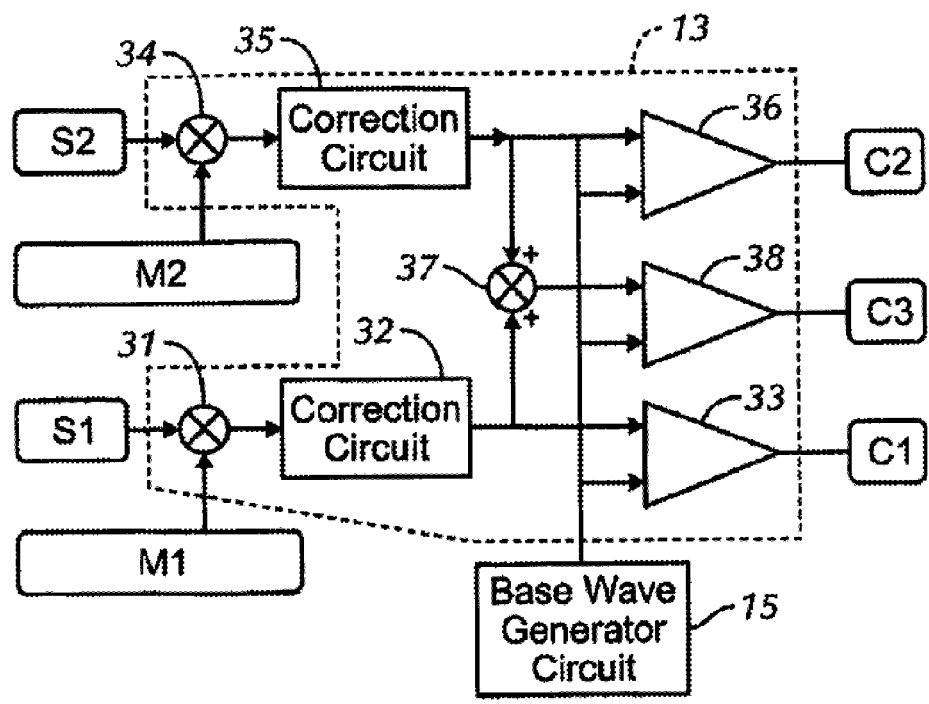
Figure 3:
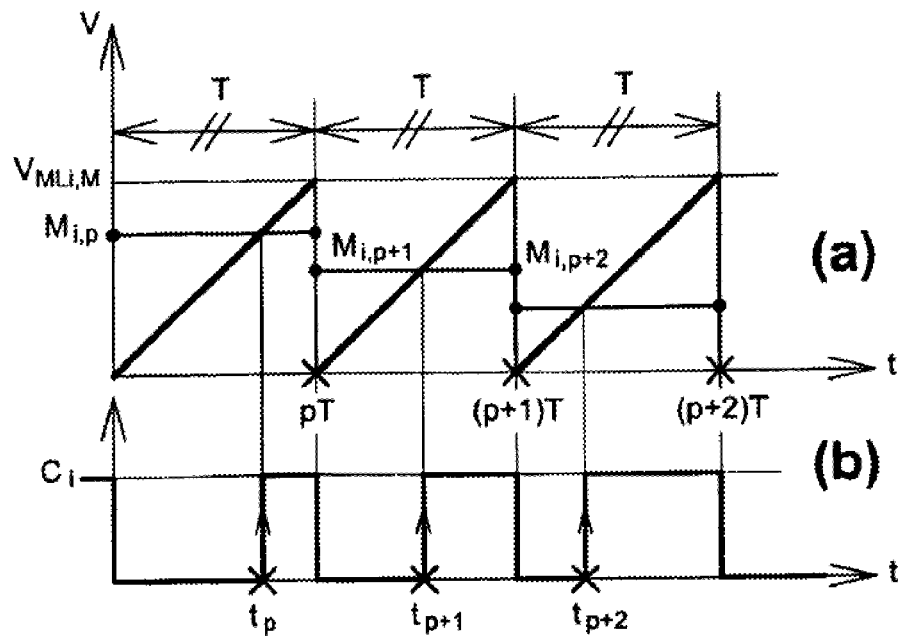
Figure 3:
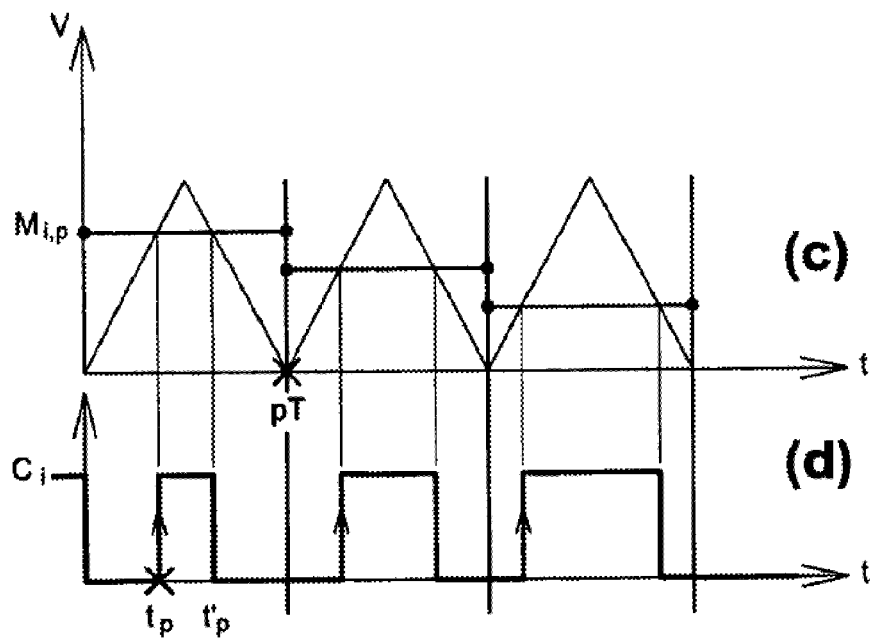
Figure 5:
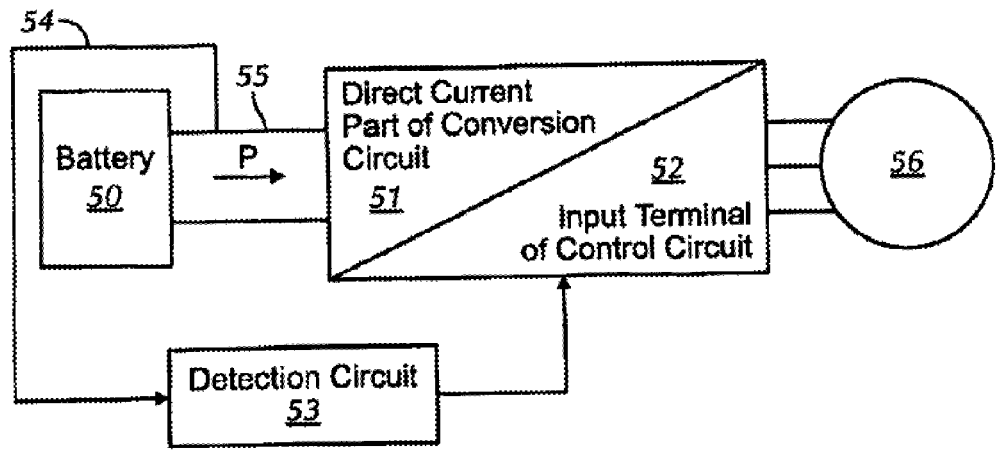
Figure 6:
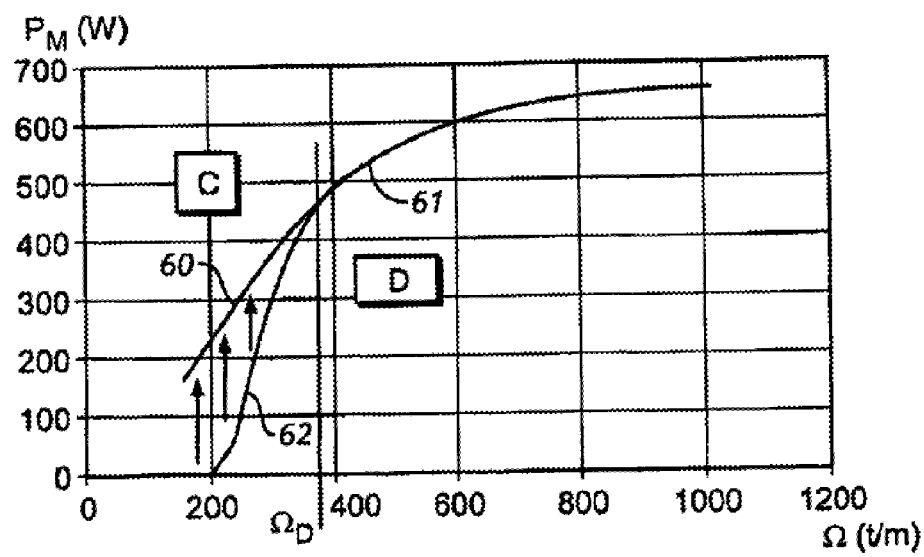
Figure 1:
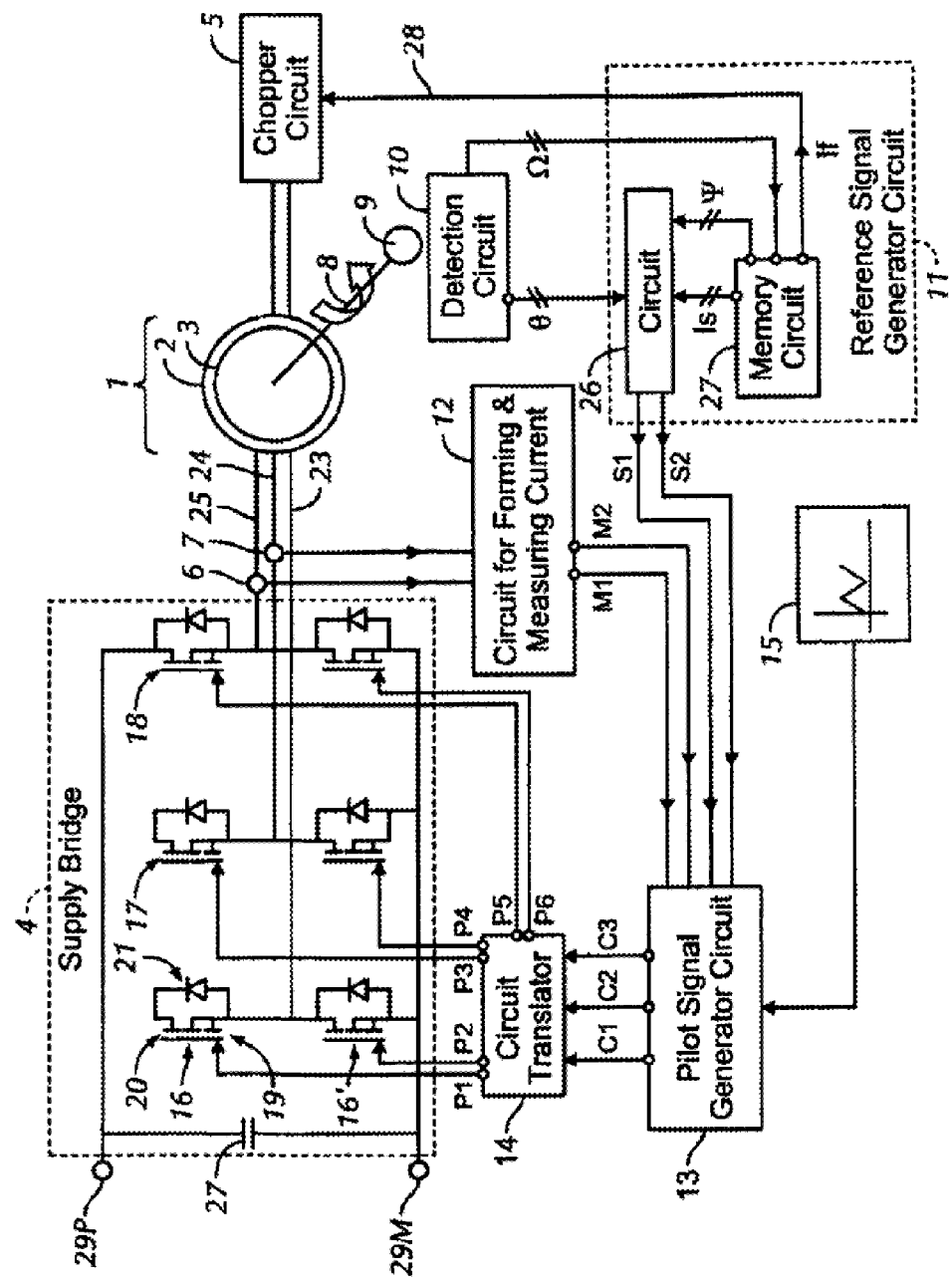
Figure 2:
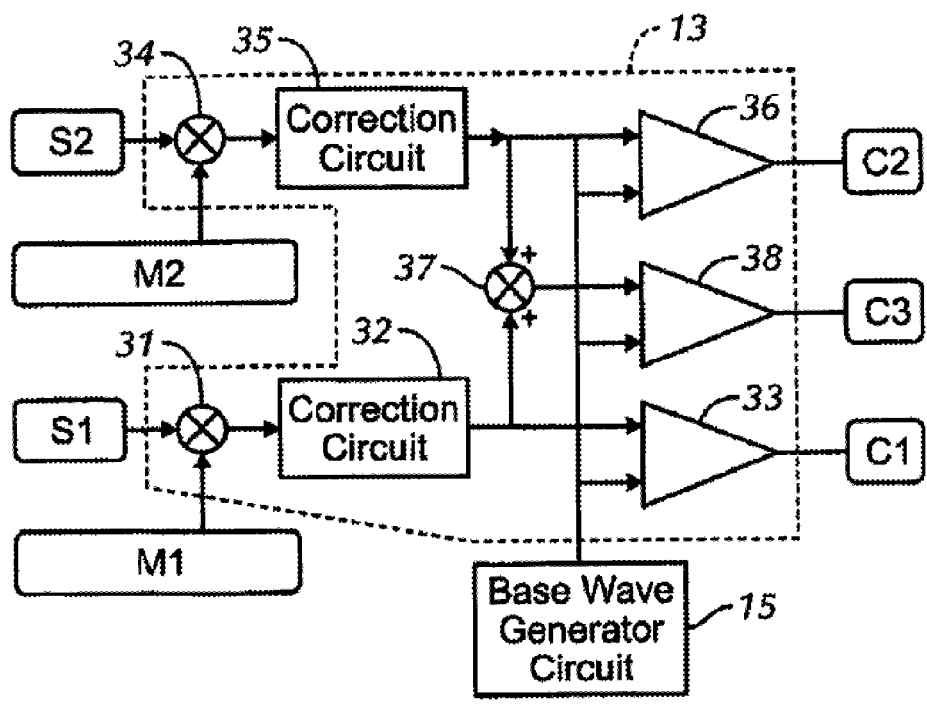
Figure 3:
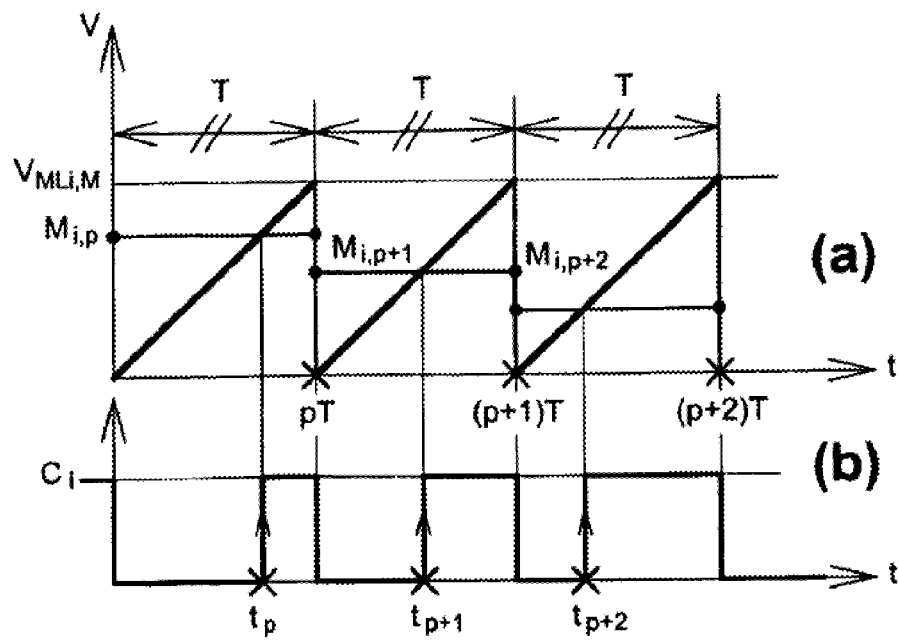
Figure 3:
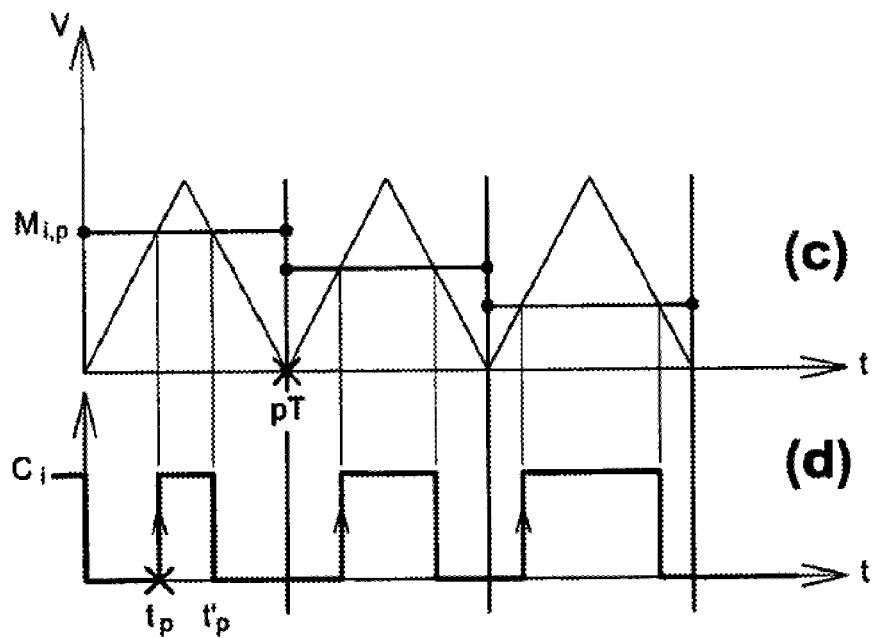
Figure 4:
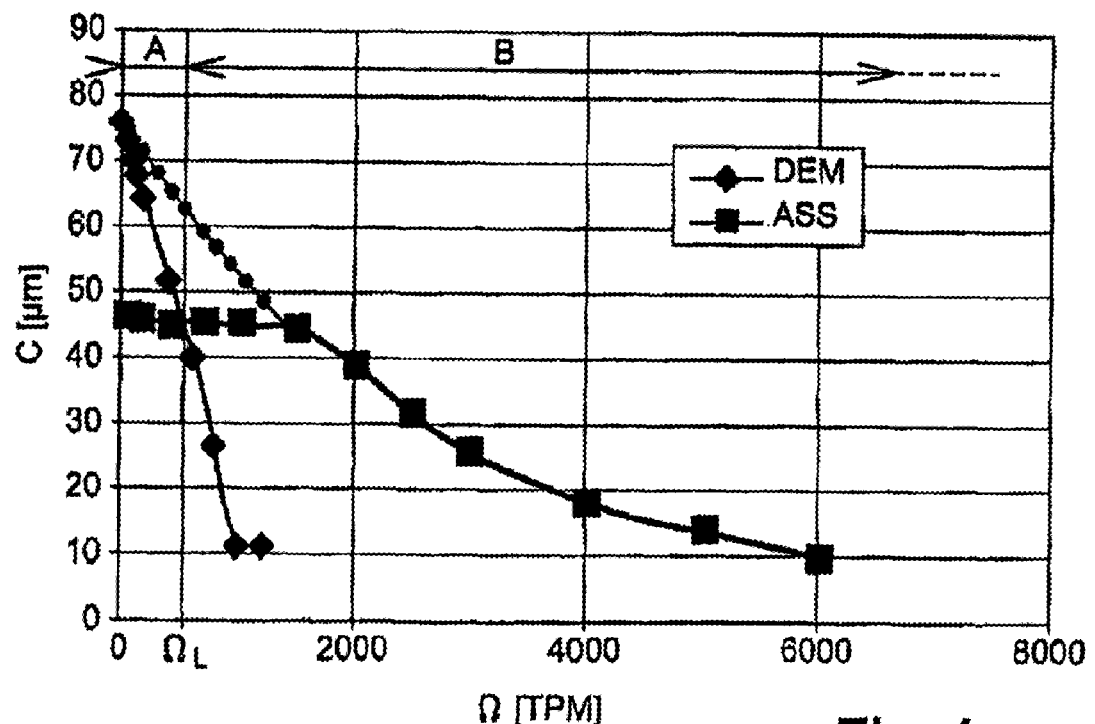
Figure 5:
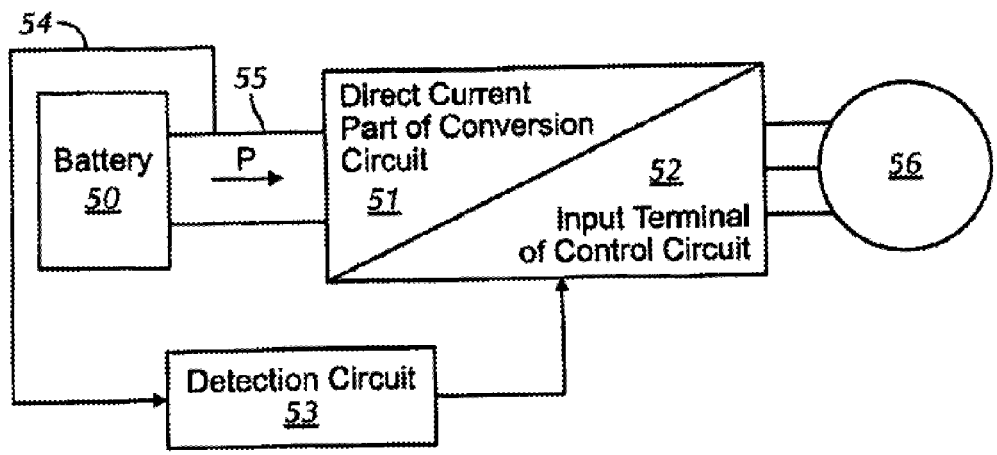
Figure 6:
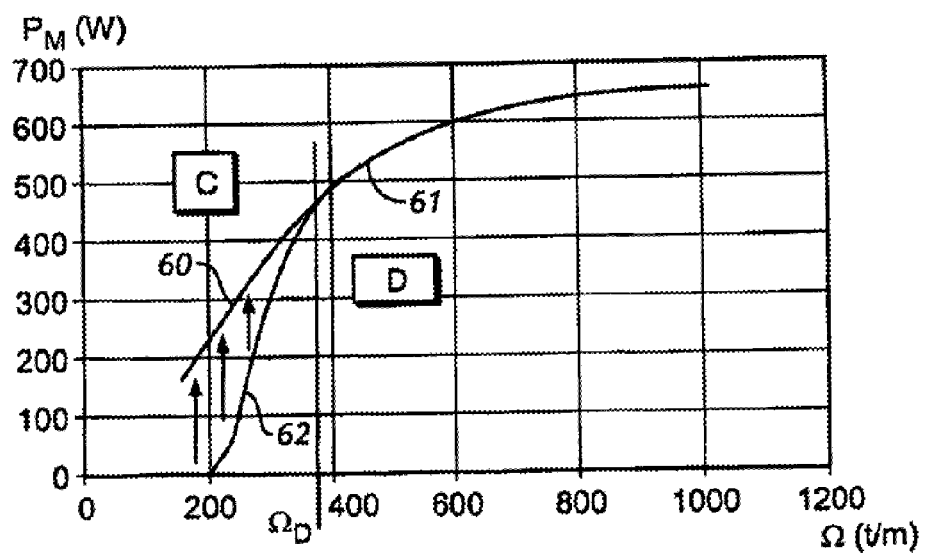

FIG. 6 represents a diagram of the electrical power available to the terminals 29P and 29N of the converter circuit loaded by the stator 2 of the electrical machine 1 when it operates in a generator, alternator or braking energy recovery mode. The control circuit of the invention determines two zones of operation in speeds by a means for recording a value limit $\Omega D$ of the rotation speed of the rotor: a zone C for the speeds that are lower than the speed limit $\Omega D$ and a zone D for speeds that are greater than $\Omega D$. The speed limit is determined by the common system when the machine works in pulse width modulation (part of curve 60) and when it works in passive or synchronous rectification with intrinsic diodes only (part of curve 62).

The control circuit of the invention also comprises circuitry to make the conversion circuit work in a pulse width modulation system as well as in systems less than OMEGA.D and only in rectification by diodes for the higher systems.

By referring again to FIG. 1, the circuitry 11 for generating the reference signals S1 and S2 for control of the stator and the control signal lf of the rotor current was represented in a particular embodiment in which a circuit 27 comprises a data memory equipped with circuitry to generate data sequences according to a feature based on the instantaneous rotation speed of the rotor and on the chosen operation mode of the electrical machine. Particularly, such a circuit may be programmed according to the Clarke and Park transformation to determine the triplet of parameters {lp, if, .psi.} that describes the electrical state of the stator and of the rotor in various turning marks with the instantaneous rotation speed of the rotor represented by the corresponding output terminal of circuit 10. The triplet {lp, lf, .psi.} is then transformed into a triplet {ls, lr, .psi.} for an analogous control or into a triplet {ld, lq, lr} for digital control. For this purpose, the circuit 27 comprises a port to input instantaneous data of the rotation speed of the rotor that is connected to an appropriate output terminal of circuit 10 and it produces a control signal representative of the current in the stator: is, an indication of the electrical angle representative of the relative state of the stator with relation to the rotor and a control signal if representative of the excitation at the rotor.

This last signal if is transmitted to the chopper circuit 5. The first two signals ls and psi $\Psi$ are transmitted to the first two input ports of a circuit 26 wherein a third port is connected to the corresponding output of the circuit 10 that develops a signal representing the instantaneous angle of rotation of the rotor 8.

The circuit 26 comprises circuitry to produce a plurality of reference signals S1, S2 . . . to determine the pulse width modulation by using the chopping wave produced by the circuit 15 as was described previously, this modulation allows a complete sinusoidal wave, a partial sinusoidal wave, and a wave in angular relation determined for each phase of the stator windings in response to the control triplet applied to the three input ports of the circuit 26 to be constructed. The circuit therefore comprises circuitry to generate reference signals according to the current relationship defined by: Si=Si(ls,lr, .psi.)

$$Si=Si(ls,lr,\psi)$$

Where Si( ) is a predetermined function that is in a first embodiment achieved in the form of a program executed by a signal processing circuit of the DSP (Harvard type Digital Signal Processing) type. In a second embodiment, the current reference signal Si( ) is generated by a sequencer that addresses, according to the triplet of features (ls, ψ, lr), a table of digital values representing a cartography determined in advance during the loading of the control circuit of the invention.

The electrical machine may be a Lundel type claw-pole rotor or salient-pole rotor machine, a machine with permanent magnets at the rotor (in which case, circuit 5 and the signal lf are not affected), an induction or variable reluctance machine, an interpolar magnet claw-pole machine, a hybrid rotor machine made of laminated iron and smooth poles with motor field and permanent magnets.

The pulse width modulation control circuit of the invention allows the electrical machine to be controlled in any range of rotation speeds of the rotor. The machine cooperates separately or in combination with: circuitry for preventing jamming of the thermal engine; circuitry for regulating the speed of the vehicle in start-up mode; circuitry for regulating the electrical power available on the on-board network of the vehicle on which the electrical machine and the control circuit of the invention are mounted; circuitry for regulating the mechanical power of the drive train of the vehicle on which the electrical machine and the control circuit of the invention are mounted; circuitry for smoothing the deceleration and stopping variations of the vehicle on which the electrical machine and the control circuit of the invention are mounted; circuitry for smoothing torque variations required at the drive train of the vehicle on which the electrical machine and The control circuit of the invention are mounted; circuitry to adapt the current in the phases of the electrical machine according to at least the state of load of the battery of the vehicle, the level of thermal energy and any other parameter for measuring the environment of the vehicle.

It is observed that the control provided by the invention assures a rapid dynamic behavior of the machine, a reduction in the magnetic noise of the electrical machine in all its operation modes, a reduction in EMC radiofrequency emissions, particularly according to the resolution of a compromise between the losses and the speed of switching the controlled interrupters used in the converter circuit.

It is observed that the control circuit of the invention assures the production of current over the entire range of operation speeds in generator mode, even at low rotation speeds.

It is observed that the control circuit of the invention assures the start-up and assistance in DEM and ASS modes even at higher rotation speeds on the order of 7,000 revolutions per minute.

The group of these advantages is made possible even with an electrical machine presenting a reduced number of turns at the stator windings which assures a reduction in the resistive power losses.

The triangular wave form may be varied particularly at the level of losses of its ascending and descending fronts. It may be replaced by a trapezoidal wave form or even with a FOC type vectorial control. The wave form may also be combined with a means to produce a hysteresis effect on the wave fronts. Such a means to produce a hysteresis effect on the wave fronts produces a time advance during activation of a wave front and/or a time lag during deactivation of a wave front.

The invention claimed is:

1. A pulse width modulation (PWM) control circuit for a polyphase electrical machine, wherein the electrical machine is equipped with a multiphase stator and a rotor, the control circuit comprising:

a reversible AC-DC current inverter circuit comprising two continuous supply terminals and controlled terminals each to be connected to at least one phase of the stator of the electrical machine;

a plurality of sensors configured to measure at least one of a current and a voltage in each phase of said electrical machine;

at least one sensor of the plurality of sensors for producing instantaneous information on a position and a speed of rotation of the rotor of the electrical machine;

a pilot circuit configured to receive information depending on measurements provided by the plurality of sensors and to control the AC-DC current inverter circuit using the received information; and signal generator circuit for configuration of the pilot circuit, said signal generator circuit configured to deliver at least one signal selected from a group consisting of first signals, second signals, third signals, fourth signals, and fifth signals, wherein the first signals are for enabling the electrical machine to operate as a starter, the second signals are for enabling the electrical machine to operate as an electric drive motor, the third signals are for enabling the electrical machine to operate as an electric reinforcement motor, the fourth signals are for enabling the electrical machine to operate as an alternator, and the fifth signals are for enabling the electrical machine to operate as an alternator recovering mechanical breaking energy.

2. The PWM control circuit according to claim 1, wherein a rotation detection circuit produces a first signal representative of the instantaneous angle of rotation of the rotor with relation to a reference position, and a second signal representative of the angular speed of rotation of the rotor.

3. The PWM control circuit according to claim 2, wherein the rotation detection circuit is connected to the inputs of a circuit that produces, first a switching control signal by a line bound for a chopper circuit connected to the excitation of the rotor and second, a plurality of reference signals bound for a pilot signal generator circuit bound for a supply bridge of the stator of the electrical machine.

4. The PWM control circuit according to claim 3, wherein the circuit also comprises a base wave generator circuit connected to an input terminal of the pilot signal generator circuit.

5. The PWM control circuit according to claim 4, wherein a base wave generated by the base wave generator circuit is comprised of a wave in triangular form, wherein the base wave presents a first increasing front at a first speed and a second decreasing front at a second speed.

6. The PWM control circuit according to claim 5, wherein the pilot signal generator circuit produces a plurality of pilot signals that are connected to the inputs of a circuit translator to produce conduction establishment signals of grids of different semiconductor interrupters of the supply bridge.

7. The PWM control circuit according to claim 6, wherein the pilot signal generator circuit comprises a subtracter wherein a first positive input terminal is connected to the input terminal of one of said reference signals and wherein a second negative input terminal is connected to the input terminal of one said measuring signals, and wherein the output terminal of the subtractor is connected to an input terminal of a correction circuit that applies a correction function that is presented at the output of the correction circuit in the form A1=F1(S1−M1).

8. The PWM control circuit according to claim 7, wherein the output signal issued from the correction circuit is applied to a first input terminal of a comparator, and wherein a second input terminal of the comparator is connected to the output of the pilot signal generator circuit, wherein the plurality of pilot signals allows the state of conduction of the controlled interrupter to be changed at the grid electrode to which the output of the comparator is connected.

9. The PWM control circuit according to claim 7, wherein the output terminals of the two correction circuits are also connected to the respective input terminals of an adder wherein the output terminal is applied to a first input terminal for a comparator wherein a second input terminal for comparison is connected to the output of the pilot signal generator circuit, and wherein the output terminal of the comparator delivers a signal to change the state of conduction of the controlled interrupter at the grid electrode to which the output terminal of the comparator is connected.

10. The PWM control circuit according to claim 1, wherein the circuit cooperates with a means for detecting an operation mode as a means for decoding a control applied to the electrical machine at an on-board computer deciding on the operation mode from among one selected from a group consisting of:

an operation mode as a starter for a thermal engine;
an operation mode as an alternator to recharge an electrical battery connected to a direct voltage on-board power supply network;
an operation mode as a drive motor working directly on wheels of a vehicle or indirectly by mixing its mechanical power with the mechanical power provided by the rest of the drive train; and
an operation mode as a generator working on the braking energy recovery required by the drive train.

11. The PWM control circuit according to claim 10, wherein, in the operation mode as a starter for the thermal engine, to increase the torque available on the rotor, the PWM control circuit comprises a means to increase the current in the stator for a number of coil turns to the given stator and a means to reinforce the current in the stator when the speed of rotation of the rotor is higher.

12. The PWM control circuit according to claim 10, wherein, in the alternator operation mode:

to be able to draw a current at the power supply network by creating an electromotor force greater than the voltage of the electrical battery for low speeds up to a speed sufficient for passing into diode rectification mode;
beyond a determined speed of rotation, the PWM control circuit comprises a means to limit the current required at the electrical battery.

13. The PWM control circuit according to claim 10, wherein the reference signal generator circuit comprises a program for the engine mode operation according to two zones determined by a speed limit, and wherein the engine mode operation comprises a DEM starter mode and an ASS help mode.

14. The PWM control circuit according to claim 13, wherein, in DEM starter mode, the circuit comprises means for determining a pulse width modulation that presents a constant output torque for a rotation speed varying from a null speed to the speed limit, and that presents a constant power decrease up to a maximum speed.

15. The PWM control circuit according to claim 13, wherein, in ASS help mode, the circuit comprises a means to determine a pulse width modulation that presents linearly decreasing output torque from a determined speed of separation between the two zones, which corresponds to an idling speed of the thermal engine up to 7,000 revolutions per minute.

16. The PWM control circuit according to claim 13, wherein when the electrical machine starts to operate in engine mode, the electrical machine comprises a supplementary circuit configured to detect when the voltage generated by the electrical battery is greater than the moiety of a nominal value of electrical battery operation with a predetermined ground voltage.

17. The PWM control circuit according to claim 3, wherein the means to produce the plurality of reference signals for the control of the stator also comprises a means to receive a load configuration control, wherein the load configuration control is provided by one selected from a group consisting of a control computer of the drive train and by a vehicle to determine if the electrical machine must work at full load or at reduced load.

18. The PWM control circuit according to claim 1, wherein the means to produce reference signals for the control of the stator also comprises a means to place the control circuit in a state such that the bridge produces a sinusoidal wave presenting a phase advance between 90 and 180 angle degrees in alternator mode.

19. The PWM control circuit according to claim 1 wherein, in alternator mode, the circuit comprises a means to determine by a recording means a value limit for the rotation speed of the rotor in two speed operation zones; a first zone for speeds under the value limit and a second zone for speeds over the value limit, wherein the value limit is determined by when the machine works in pulse width modulation and when the machine works in passive rectification with intrinsic diodes only.

20. The PWM control circuit according to claim 1 wherein, in alternator mode, the circuit comprises a means for making the conversion circuit work in a pulse width modulation system for the systems under the value limit or only by rectification by diodes for systems over the value limit.

21. The PWM control circuit according to claim 1 wherein the means for generating reference signals for the control of the stator and the control signal of the rotor current comprises a circuit that comprises a data memory equipped with a means to generate data sequences according to a feature based on an instantaneous rotation speed of the rotor and of a chosen operation mode of the electrical machine.

22. The PWM control circuit according to claim 21, wherein the memory circuit is programmed according to the Clarke and Park transformation to determine a triplet of parameters that describes an electrical state of the stator and of the rotor in various turning marks with the instantaneous rotation speed of the rotor developed by the corresponding output terminal of the rotation detection circuit.

23. The PWM control circuit according to claim 22, wherein the signals representing a stator current and an electrical angle are transmitted to two first input ports of a circuit wherein a third port is connected to the corresponding output of the circuit that develops a signal representing the instantaneous angle of rotation of the rotor and in that the circuit comprises a means to produce a plurality of reference signals to determine the pulse width modulation by using the chopping wave produced by the base wave generator circuit.

24. The PWM control circuit according to claim 23, wherein the circuit to produce reference signals comprises means for generating reference signals according to the current relationship defined by Si=Si (ls, $\Psi$, IR). where SI() is a predetermined function.

25. The PWM control circuit according to claim 23, wherein the circuit for producing reference signals comprises means achieved in the form of a program executed by a digital signal processor (DSP).

26. The PWM control circuit according to claim 23, wherein the circuit for producing reference signals comprises means for generating a current reference signal Si() by a sequencer that addresses, according to the triplet of parameters, a table of digital values representing a cartography determined in advance during the loading of the PWM control circuit.

27. The PWM control circuit according to claim 1, wherein the electrical machine is one selected from a group consisting of a Lundel type claw-pole rotor of salient-pole rotor machine, a machine with permanent magnets at the rotor, an induction or variable reluctance machine, an interpolar magnet claw-pole machine, and a hybrid rotor machine made of laminated iron and smooth poles with motor field and permanent magnets.

28. The PWM control circuit according to claim 1, wherein the electrical machine comprises means to control the electrical machine in the entire range of rotation speeds of the rotor.

29. The PWM control circuit according to claim 1, wherein the wave form generator circuit produces a wave in one selected from a group consisting of a sawtooth form, a triangle form a trapezoidal form, a FOC type vectorial control wave, and a wave form combined with a means to produce a hysteresis effect on wave fronts.

30. An electrical machine for a vehicle, wherein the electrical machine operates as one selected from a group consisting of a starter, an electrical drive motor, an electrical booster motor, an alternator, and a braking energy recovery alternator, wherein the electrical machine is adapted to operate with a control circuit according to claim 1, wherein the electrical machine comprises a wound stator, wherein a number of coils of the wound stator is calculated based on the lowest magnetization energy and wherein a current control is applied by means of the control circuit for operation modes that require a higher magnetization energy.

* * * * *

UNITED STATES PATENT AND TRADEMARK OFFICE
CERTIFICATE OF CORRECTION

PATENT NO.        : 7,391,180 B2
APPLICATION NO. : 10/559015
DATED             : June 24, 2008
INVENTOR(S)       : Paul Armiroli et al.

It is certified that error appears in the above-identified patent and that said Letters Patent is hereby corrected as shown below:

Drawings:
Add the drawing sheets, consisting of (a) (b) (c) and (d) of fig. 3 as shown on the attached page.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO.         : 7,391,180 B2
APPLICATION NO. : 10/559015
DATED              : June 24, 2008
INVENTOR(S)        : Paul Armiroli et al.

It is certified that error appears in the above-identified patent and that said Letters Patent is hereby corrected as shown below:

Delete the title page and substitute therefore the attached title page.

Drawings:
        Add the drawing sheets, consisting of (a) (b) (c) and (d) of fig. 3 as shown on the attached page.

This certificate supersedes the Certificate of Correction issued November 18, 2008.

Signed and Sealed this

Ninth Day of December, 2008

JON W. DUDAS
*Director of the United States Patent and Trademark Office*

United States Patent
Armiroli et al.

(10) Patent No.: US 7,391,180 B2
(45) Date of Patent: Jun. 24, 2008

(54) PULSE WIDTH MODULATION CONTROL CIRCUIT FOR A MULTIMODE ELECTRICAL MACHINE, AND A MULTIMODE ELECTRICAL MACHINE EQUIPPED WITH SUCH A CONTROL CIRCUIT

(75) Inventors: Paul Armiroli, Marolles en Brie (FR); Cédric Plasse, Garches (FR)

(73) Assignee: Valeo Equipements Electrique Moteur, Creteil (FR)

(*) Notice: Subject to any disclaimer, the term of this patent is extended or adjusted under 35 U.S.C. 154(b) by 0 days.

(21) Appl. No.: 10/559,015

(22) PCT Filed: Jun. 1, 2004

(86) PCT No.: PCT/FR2004/001352
§ 371 (c)(1),
(2), (4) Date: Feb. 12, 2007

(87) PCT Pub. No.: WO2005/109624
PCT Pub. Date: Nov. 17, 2005

(65) Prior Publication Data
US 2007/0200531 A1  Aug. 30, 2007

(30) Foreign Application Priority Data
May 30, 2003  (FR) .......... 03 06554

(51) Int. Cl.
*H02P 27/04* (2006.01)

(52) U.S. Cl. .......... 318/801; 318/701; 318/700; 180/65.1; 180/65.2

(58) Field of Classification Search .......... 318/138, 318/139, 254, 439, 700, 701, 800, 803, 812, 318/813, 801; 180/65.1, 65.2; 701/22
See application file for complete search history.

(56) References Cited

U.S. PATENT DOCUMENTS

| | | | |
|---|---|---|---|
| 6,366,048 B2 * | 4/2002 | Greif | 318/701 |
| 6,982,018 B2 * | 6/2005 | Hisada et al. | 180/65.1 |
| 7,100,721 B2 * | 9/2006 | Aturashi et al. | 180/65.2 |
| 7,228,209 B2 * | 6/2007 | Izawa et al. | 701/22 |
| 2002/0007975 A1 | 1/2002 | Naito et al. | |
| 2002/0043953 A1 * | 4/2002 | Masaki et al. | 318/700 |
| 2003/0034187 A1 * | 2/2003 | Hisada et al. | 180/65.1 |
| 2003/0034755 A1 | 2/2003 | Krefta et al. | |

FOREIGN PATENT DOCUMENTS

| | | |
|---|---|---|
| EP | 0-660-501 | 6/1995 |
| EP | 0-901-930 | 3/1999 |
| EP | 1-219-493 | 7/2002 |
| FR | 2-745-445 | 8/1997 |
| FR | 2-802-363 | 6/2001 |

OTHER PUBLICATIONS

International Search Report, Application PCT/FR2004/001352, dated Nov. 23, 2004 (7 pages).

* cited by examiner

*Primary Examiner*—Paul Ip
(74) *Attorney, Agent, or Firm*—Osha Liang LLP

(57) ABSTRACT

A pulse width modulation (PWM) control circuit for a multimode electrical machine and a multimode electrical machine equipped with such a control circuit, including a configuration circuit that detects the operation mode of the electrical machine and produces a pulse width modulation to control a reversible current inverter circuit such that the electrical machine operates optimally in torque in engine modes and in current generator modes. The invention applies to vehicle alternators and starters.

30 Claims, 5 Drawing Sheets